Dec. 6, 1960 J. H. SASSEEN 2,963,682
KEYED MODULATION SYSTEM FOR MODULATING NON-TIME
DEPENDENT SIGNALS IN PROPORTION TO REAL TIME
Filed June 6, 1957
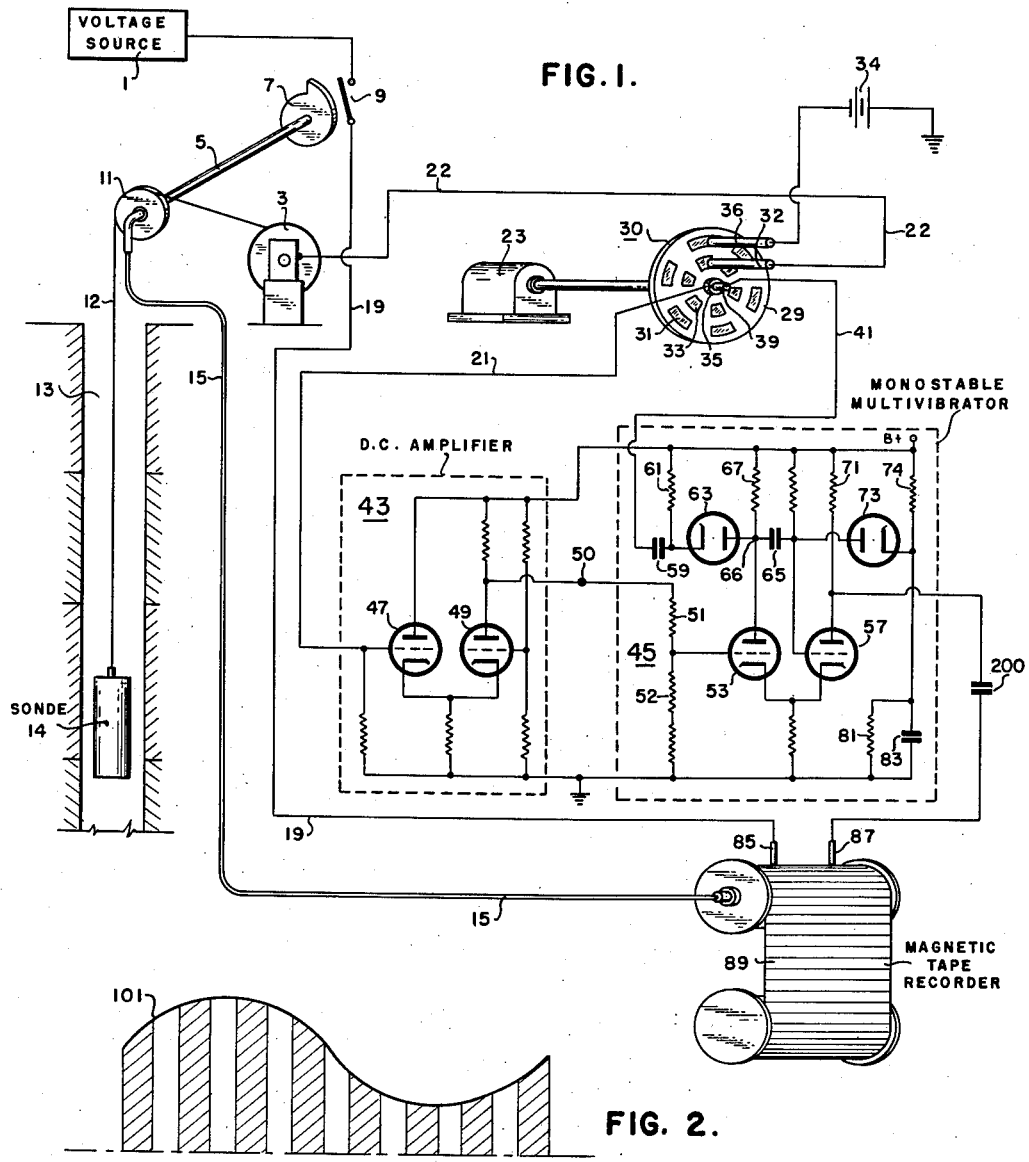
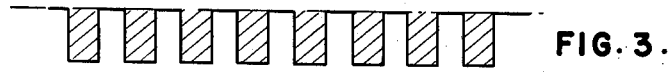
INVENTOR.
JOHN H. SASSEEN,
BY
ATTORNEY.

United States Patent Office 2,963,682
Patented Dec. 6, 1960

2,963,682

KEYED MODULATION SYSTEM FOR MODULATING NON-TIME DEPENDENT SIGNALS IN PROPORTION TO REAL TIME

John H. Sasseen, Harris County, Tex., assignor, by mesne assignments, to Jersey Production Research Company, Tulsa, Okla., a corporation of Delaware Filed June 6, 1957, Ser. No. 663,980

3 Claims. (Cl. 340—18)

This invention is related to well logging systems, and more particularly to systems for recording electrical signals derived from well logging devices.

In the past, it has been common practice to directly record the electrical signals of varying amplitude, phase, and frequency derived from well logging devices by galvanometric recording devices. A recent practice is to record well log signals on magnetic tape also using the direct recording process. A disadvantage associated with direct recording on magnetic tape is that the D.C. level of the signal is thereby lost; i.e., the quiescent reference level of the signals cannot be regained upon playback by usual means.

In U.S. Patent No. 2,841,778 J. D. Ball et al. for "The Generation and Recording of Displacement Dependent Modulated Carrier," there are described systems for recording electrical signals derived from well logging devices wherein the D.C. level of the signals is preserved. While the systems described therein have been found to be entirely satisfactory, for certain applications the systems are unduly complex. For example, in many locations the well logging devices traverse boreholes at essentially a constant speed with practically no danger of hangups or other circumstances under which the speed of the logging device through the borehole can vary appreciably. The complexity of the systems described in the aforementioned application by J. D. Ball et al., inherently adds to the maintenance problems at field locations and to the initial expense of the recording system.

Accordingly, one object of this invention is to provide an improved system for recording well logging signals wherein the D.C. component of the logged signal may be preserved.

Another object is to provide a simple system for recording well logging signals under conditions wherein a logging sonde traverses a borehole at a relatively constant speed.

Other objects and a more complete understanding of the invention will be obtained upon consideration of the following description in connection with the accompanying drawing wherein:

Fig. 1 is a schematic circuit diagram of a preferred embodiment of the invention, and Figs. 2, 3, and 4 are waveform representations of electrical signals at various points in the circuitry of Fig. 1.

In accordance with one aspect of the invention, use is made of a monostable multivibrator of the type that produces an output pulse upon reception of a triggering pulse at a first control terminal thereof, the output pulse having a duration functionally related to the amplitude of a control signal coupled to a second control terminal thereof. The electrical logging signal derived from a conventional well logging source is coupled to the multivibrator second control terminal, and the multivibrator is repetitively pulsed at a constant repetition rate by triggering pulses coupled to the first control terminal thereof. The time duration of the output pulses thus will be controlled by the amplitude of the logging signal. Reference pulses indicative of the depth of the logging device are produced and recorded in side-by-side relationship with the output signals of the multivibrator so that the amplitude of the logging signals can be correlated with the depth of the logging device.

With reference now to Fig. 1, there is depicted a logging sonde 14 suspended in a borehole 13 on a wire line 12. The wire line is wound on a reel 3 driven by a motor in the usual manner. A sheave arrangement 11 is utilized to suspend the sonde for free movement through the borehole. On a common shaft 5 with sheave 11 is a cam 7, the function of which is to close switch 9 regularly with rotation of sheave 11. Switch 9 couples a voltage source 1 to a recording head 85 of a tape recording device such as a magnetic tape recorder by means of electrical conductor 19. The function of the system including cam 7, switch 9, voltage source 1, and recording head 85, is to produce and record pulses indicative of the depth of sonde 14 within borehole 13. With rotation of cam 7, switch 9 will close so as to produce a momentary flow of electric current to recording head 85. Manifestly, it is relatively simple to correlate the periodic pulses produced thereby with the depth of the sonde in the borehole. Other systems may be utilized for the purpose of accomplishing the same function. Conventional mechanical or electrical drive means 15 effects movement of the magnetic tape 89 in proportion to movement of sheave 11. The drive means may be a mechanical connection, as shown, a selsyn electrical system, or other means well known to the art.

Wire line 12 includes an electrical conduit (not shown) for the purpose of conducting electrical signals from sonde 14 to the earth's surface and thence through a slip ring or other suitable arrangement in reel 3 to electrical conductor 22. These electrical logging signals are converted into pulses, the amplitudes of which are indicative of the amplitude of the logging signals, by means of a commutator arrangement 30, and are coupled to a control terminal 50 of multivibrator 45 by means of a D.C. amplifier 43. For the purpose of providing triggering pulses of constant pulse repetition rate to input terminal 66 of multivibrator 45, there is provided a direct current source 34 coupled to multivibrator 45 by means of commutator arrangement 30, coupling capacitor 59, and diode 63.

Commutator 30 may be of the type described in U.S. Patent No. 2,696,570 to G. J. Pandapas, or similar devices that function to "chop" an electric signal. For example, the commutator may be of the type shown in the drawing wherein a disc 29 has imbedded therein two rings 31 and 33 of conductive segments, ring 31 being connected to a slip ring 35 and ring 33 being connected to slip ring 39. A brush 36 connects the negative terminal of direct terminal source 34 to ring 31, the positive terminal D.C. source being grounded. Similarly, electric conductor 22 is connected to conductive segment ring 33 by means of brush 32, and electric conductor 21 connects slip ring 35 to the input terminal of D.C. amplifier 43 where the chopped logging signal is amplified and coupled to input terminal 50 of multivibrator 45. Similarly, electric conductor 41 connects slip ring 39 to coupling capacitor 59.

Commutator 30 is driven by the output shafts of drive motor 23 at a constant rotational speed. The commutator must rotate at a constant speed so that the output pulses therefrom will be of constant duration and equally spaced apart in time.

D.C. amplifier 43 comprises a pair of vacuum tubes 47 and 49, vacuum tube 47 being connected in a cathode follower configuration to vacuum tube 49. A D.C. amplifier is preferred at this point to most faithfully reproduce the relatively low frequency logging signals.

Monostable multivibrator 45 may be of the type described in the text "Waveforms," vol. 19 of the M.I.T. Radiation Laboratory Series, sec. 5.5, pages 168–173. As shown in Fig. 1, the multivibrator comprises a pair of triodes 53 and 57, and has a common cathode resistor connected between ground and the cathodes of the tubes 53 and 57. Terminal 50, which receives the output signals of D.C. amplifier 43 is coupled to the grid electrode of tube 53 by means of a voltage divider including serially connected resistors 51 and 52 which are connected between terminal 50 and ground. The grid electrode of tube 53 is connected to the juncture of resistors 51 and 52. The plate electrodes of tubes 53 and 57 are connected to a source of D.C. potential by means of resistors 67 and 71, respectively. Capacitor 65 couples the plate of vacuum tube 53 to the grid electrode of vacuum tube 57. The grid electrode of vacuum tube 57 is also coupled to the positive terminal of the D.C. source through a diode 73 serially connected with a resistor 74, the plate of the diode being connected to the grid of vacuum tube 57 and the cathode to resistor 74. The cathode of diode 73 is coupled to ground by means of parallel connected resistor 81 and capacitor 83.

As set forth above, triggering impulses are applied to the multivibrator at terminal 66 (which is connected directly to the plate electrode of vacuum tube 53) through a coupling network including capacitor 59, diode 63 (the plate of which diode is connected to terminal 66), and resistor 61 connected between the cathode of diode 63 and the positive terminal of the D.C. supply. Output pulses from the plate of vacuum tube 57 are applied to recording head 87 of the magnetic tape recorder 89 through capacitor 200.

For a complete description of the operation of the multivibrator, reference is made to the aforementiontd text "Waveforms." It is sufficient here to note that, initially, vacuum tube 57 is conducting and vacuum tube 53 is non-conducting. Negative polarity pulses applied to input terminal 66 act to reverse the conduction states of tubes 53 and 57. The voltage appearing at control terminal 50 will determine the duration over which vacuum tube 57 is non-conducting and vacuum tube 53 is conducting. To insure that there will be no false triggering of the multivibrator by transient pulses appearing at control terminal 50 while the multivibrator is in its normal state with vacuum tube 57 conducting and tube 53 non-conducting, the logging signals applied to terminal 50 through D.C. amplifier 43 are also pulsed or chopped by means of the commutator 30, as described above. Preferably, the signals applied to terminals 66 and 50 are pulsed or chopped in phase. To provide sufficient discrimination between the output signals, the duration of the output pulses should vary between about 15% and 60% of the interval between the leading edges of the control pulses applied to terminal 66. In other words, when the voltage applied to terminal 50 is at its minimum amplitude, the output pulse from the multivibrator derived between the plate of tube 57 and ground should have a duration of about 15% of the interval between the leading edges of successive output pulses; when the voltage appearing at terminal 50 is at peak, or maximum amplitude, the output pulse of the multivibrator should have a duration not more than 60% of the interval between the leading edges of successive pulses. Manifestly, intermediate voltages appearing at terminal 50 will produce output pulses having intermediate pulse durations.

After the output pulses from multivibrator 45 have been recorded on the magnetic tape recorder, they must be played back and re-recorded in order to be useful for analytical purposes. Demodulators which will retain the D.C. component of the originally recorded signal are used. Suitable demodulators for this purpose may be found in the text "Modulation Theory," by H. S. Black (Van Nostrand, 1953) at page 276, or in the aforementioned patent of J. D. Ball et al., the device shown in Fig. 15 being suitable for this purpose.

Fig. 2 illustrates the waveform of the signals that would be applied to terminal 50 assuming that a sinusoidal logging signal 101 is derived from the logging sonde. The shaded pulses, which are samples of the sinusoidal signal and which are applied to the multivibrator, will be substantially rectangular in form, having, however, a varying amplitude, depending upon the duration of the sampled signal. Manifestly, greatest accuracy will be obtained when the pulses are of short duration since the percentage variation will thus be minimized. Pulses of short duration require that the sampling rate be very high. It has been found that 60 pulses per foot of borehole will give sufficient accuracy for practical purposes, and that the maximum logging rate is approximately one foot per second. Therefore, a pulsing rate of 60 pulses per second is sufficient for purposes of accuracy.

Fig. 3 illustrates the waveform of the output pulses from the commutator 30 appearing on electrical lead 41. These rectangular wave pulses are applied to the differentiating circuit, including capacitor 59 and resistor 61 to obtain sharp output pulses with fast rise time and are clipped by means of diode 63 so that only negative triggering pulses from source 34 are applied to the plate of tube 53.

Fig. 4 illustrates the waveform of the output pulses of the multivibrator appearing between the plate of vacuum tube 57 and ground assuming that the signals shown in the shaded areas of Fig. 2 are applied to the control terminal 60; i.e., assuming a sinusoidal logging signal. It is to be noted that Figs. 2, 3, and 4 all have the same time scale and that the signals applied to terminals 66 and 50 are co-phasal. Note further that the output pulses of greatest duration, as shown in Fig. 4, correspond to the pulses in Fig. 2 having maximum amplitude and that the input pulse having minimum duration corresponds to the pulse in Fig. 2 having minimum amplitude. Note further that the duration of the intermediate pulses in Fig. 4 are variable as a function of the amplitude of the pulses in Fig. 2. The duration of the pulse in Fig. 4 is not determined by the maximum amplitude of the corresponding pulse in Fig. 2 or its minimum amplitude, but by an intermediate amplitude that will occur at an earlier or later time in the cycle of the pulse, depending on whether the amplitude of the logging signal 101 is increasing or decreasing. As noted above, greatest accuracy will be obtained by using fast sampling of the logging signals.

It is to be noted that the output voltages energizing recording heads 85 and 87 are taken with respect to ground, but that no connection is shown between ground and recording heads 85 and 87. It is to be understood that, in practice, such connection will be made, and that the leads are eliminated here in order to avoid undue confusion in the drawings.

It is manifest that the objects set forth above will be achieved by the invention as described. The apparatus is quite simple and will be found to provide very accurate recordation and reproduction of well logging signals as long as the speed at which the logging sonde traverses the borehole remains reasonably constant. Variations in speed of the sonde will have only second order effects on the accuracy of the system.

The invention is not to be restricted to the specific structural details, arrangement of parts, or circuit connections herein set forth, as various modifications thereof may be effected without departing from the spirit and scope of this invention.

What is claimed is:

1. In a well logging system: a logging device; first means for passing a logging device through a borehole at a substantially constant velocity, said logging device being adapted to produce first electrical signals representative of physical characteristics of earth formations traversed by said borehole; second means coupled to said logging device for transmitting said electrical signals to the surface of the earth; a source of relatively unvarying direct voltage; third means coupled to said first means and to said direct voltage source adapted to sample the output voltages thereof at a constant repetition rate to produce first and second co-phasal pulse trains from said first means and said direct voltage source respectively; modulating means coupled to said third means adapted to produce an output pulse upon actuation by one of said second co-phasal pulses, said output pulse having a duration functionally related to the amplitude of the one of said first co-phasal pulses simultaneously applied to said modulating means with said one of said second co-phasal pulses; pulse generating means coupled to said first means for producing pulses indicative of the depth of said logging device; and means for recording said pulses indicative of depth and said output pulses of said modulating means in side-by-side relationhsip.

2. In a well logging system: a logging device; first means for passing said logging device through a borehole with a substantially constant velocity, said logging device being adapted to produce first electrical signals representative of physical characteristics of earth formations traversed by said borehole; coupling means coupled to said logging device for transmitting said electrical signals to the surface of the earth; a source of relatively unvarying direct voltage; commutator means for converting said electrical signals and the output voltage of said direct voltage source respectively into first and second co-phasal pulse trains, the amplitude of each of the pulses of said first pulse train being representative of the amplitude of said electrical signals concomitant therewith, and the pulses of said second pulse train being of substantially constant amplitude; means driving said commutator means adapted to produce an output pulse upon actuation of each pulse of said second pulse train; each output pulse having a duration functionally related to the amplitude of the pulse of said second pulse train concomitant therewith; pulse generating means coupled to said first means for producing pulses indicative of the depth of said logging device; and recording means coupled to said modulating means and to said pulse generating means for recording said pulses indicative of depth and said output pulses of said modulating means in side-by-side relationship.

3. In a well logging system: first means for passing a logging device through a borehole at a substantially constant velocity, said logging device being adapted to produce first electrical signals representative of physical characteristics of earth formations traversed by said borehole; a source of relatively unvarying direct voltage; a nonconductive wheel supporting first and second sets of angularly spaced conductive segments, each individual segment of said first set being radially aligned with an individual segment of said second set; means for rotating said wheel at a uniform angular velocity; first and second slip rings on said wheel respectively connected to each individual segment of said first and second sets, respectively; first and second brush means for said first and second sets of segments, respectively adapted to momentarily and successively contact said segments upon rotation of said wheel; said first brush means being electrically connected to said logging device to receive said output signals thereof; and said second brush means being connected to said voltage source; monostable multivibrator means having a first input terminal and a second input terminal means, said multivibrator means being adapted to produce an output pulse upon reception of a pulse at said first input terminal thereof, said output pulse having a duration functionally related to the amplitude of an electrical signal appearing at said second input terminal thereof concomitant with said pulse at said first input terminal; direct current amplification means coupling said first slip ring to said second input terminal; unilateral impedance means coupling said second slip ring to said first input terminal; pulse generating means coupled to said first means for producing pulses indicative of the depth of said logging device; and magnetic recording means coupled to said pulse generating means and to said monostable multivibrator means magnetically recording said pulses indicative of depth and said output pulses in side-by-side relationship.

References Cited in the file of this patent
UNITED STATES PATENTS

| | | |
|---|---|---|
| 2,651,027 | Vogel | Sept. 1, 1953 |
| 2,789,270 | Finkel | Apr. 16, 1957 |